(12) United States Patent
De Filippis

(10) Patent No.: US 11,374,470 B2
(45) Date of Patent: Jun. 28, 2022

(54) ROTARY ELECTRIC MACHINE

(71) Applicant: SPAL AUTOMOTIVE S.r.l., Correggio (IT)

(72) Inventor: Pietro De Filippis, Varazze (IT)

(73) Assignee: SPAL AUTOMOTIVE S.R.L., Corregio (IT)

( * ) Notice: Subject to any disclaimer, the term of this patent is extended or adjusted under 35 U.S.C. 154(b) by 169 days.

(21) Appl. No.: 16/838,258

(22) Filed: Apr. 2, 2020

(65) Prior Publication Data

US 2020/0321837 A1     Oct. 8, 2020

(30) Foreign Application Priority Data

Apr. 4, 2019    (IT) .................. 102019000005074

(51) Int. Cl.
*H02K 11/33* (2016.01)
*F04D 25/08* (2006.01)
(Continued)

(52) U.S. Cl.
CPC ........... *H02K 11/33* (2016.01); *F04D 25/082* (2013.01); *F04D 29/5813* (2013.01); *H02K 5/15* (2013.01);
(Continued)

(58) Field of Classification Search
CPC ........ H02K 11/33; H02K 5/15; H02K 5/1672; H02K 5/1732; H02K 2205/09;
(Continued)

(56) References Cited

U.S. PATENT DOCUMENTS

| 3,873,861 A | 3/1975 | Halm |
| 2002/0003911 A1* | 1/2002 | Smith .................. F16C 23/045 384/204 |

(Continued)

FOREIGN PATENT DOCUMENTS

| CN | 208687039 U | 4/2019 |
| DE | 19517689 A1 | 11/1996 |
| WO | 2013008180 A2 | 1/2013 |

OTHER PUBLICATIONS

Italian Search Report dated Oct. 16, 2019 from counterpart Italian App No. IT 201900005074.

*Primary Examiner* — Ahmed Elnakib
(74) *Attorney, Agent, or Firm* — Shuttleworth & Ingersoll, PLC; Timothy Klima

(57) ABSTRACT

A rotary electric machine includes an enclosure delimiting an internal space for stator and rotor units. An access hole gives access to the internal space. An internal gasket encircles the access hole adjacent a wall of the enclosure. A closing element is disposed in the internal space, movable towards and away from the wall between a closed configuration compressing the gasket to seal the access hole and an open configuration connecting the internal space with the surrounding atmosphere. An elastic device operates to move the closing element from the open to closed configurations to compress the gasket and seal the access hole. The closing element has a pressure surface facing the access hole and accessible through the access hole via a pin. Pressing the pressure surface causes the closing element to move from the closed configuration to the open configuration.

16 Claims, 4 Drawing Sheets

(51) Int. Cl.
*F04D 29/58* (2006.01)
*H02K 5/15* (2006.01)
*H02K 5/167* (2006.01)
*H02K 5/173* (2006.01)

(52) U.S. Cl.
CPC ......... *H02K 5/1672* (2013.01); *H02K 5/1732* (2013.01)

(58) Field of Classification Search
CPC .......... H02K 5/173; H02K 5/10; H02K 5/124; H02K 5/16; H02K 15/14; F04D 25/082; F04D 29/5813
USPC ................................................. 310/68 R, 89
See application file for complete search history.

(56) References Cited

U.S. PATENT DOCUMENTS

2008/0042503 A1* 2/2008 Hartkorn ................. H02K 1/28
  310/90
2016/0149460 A1* 5/2016 Greve ..................... H02K 5/16
  310/88

* cited by examiner

ROTARY ELECTRIC MACHINE

This application claims priority to Italian Patent Application 102019000005074 filed Apr. 4, 2019, the entirety of which is incorporated by reference herein.

This invention relates to the technical field of electric machines.

More specifically, this invention relates to a rotary electric machine and to a method for producing a machine of this kind.

Generally speaking, this specification also refers to what in technical terms are known as "sealed" electric machines, without thereby losing in generality, that is to say, without excluding, unless otherwise specified, machines known as "open" machines.

The term "sealed rotary electric machine" is used to denote a closed electric machine comprising a sealed container—or enclosure—which is generally composed of a casing and a cap fixed sealedly thereto and from which there extend the shaft of the rotor unit and the terminals for powering and controlling the machine.

The main advantage of sealed electric machines is that the moving parts and electronic control circuitry located inside the container are isolated from extraneous agents such as liquids and dust, for example, which can interfere with the functioning of the electric machine, leading to failures and rapid wear of components.

For convenience, the term "sealed machines is also used to refer to electric machines in which the electronic control circuitry is mounted in a sealed compartment, whilst the stator and the rotor are housed in an open compartment which, for example, can be ventilated for cooling purposes.

Thus, thanks to the isolation provided by their sealed enclosures, these electric machines are characterized by high dependability and long-life durability.

A rotary electric machine of the "sealed" type is illustrated by way of example in patent application WO2013/008180 in the name of the same Applicant.

In order to ensure that the interior of the enclosure or sealed compartment remains free of dust and humidity, these machines are normally assembled in a controlled atmosphere which keeps dust and humidity out of the assembly space completely (or limits their presence to very small quantities).

Up to the present, in the solutions where the internal space is totally inaccessible, the enclosure is sealed by fixing the casing to the cap.

Disadvantageously, a solution of this kind prevents access to the internal space for operations which might become necessary after the enclosure has been sealed.

For example, it may be necessary to access the internal space to work on the shaft of the rotor unit when mounting rotary components thereon.

In this context, the technical purpose which forms the basis of this invention is to propose a rotary electric machine, as well as a method for making it, to overcome at least some of the above mentioned disadvantages of the prior art.

More specifically, this invention has for an aim to provide a rotary electric machine capable of providing access to the internal space of the enclosure after the enclosure has been closed.

The technical purpose indicated and the aims specified are substantially achieved by a rotary electric machine comprising the technical features described in one or more of the accompanying claims.

The dependent claims correspond to possible different embodiments of the invention.

Other features and advantages of the invention are more apparent in the detailed description below, with reference to a non-limiting and non-exclusive preferred embodiment of a rotary electric machine and a method for making it.

The description is set out below with reference to the accompanying drawings which are provided solely for purposes of illustration without restricting the scope of the invention and in which.

Figure 1:
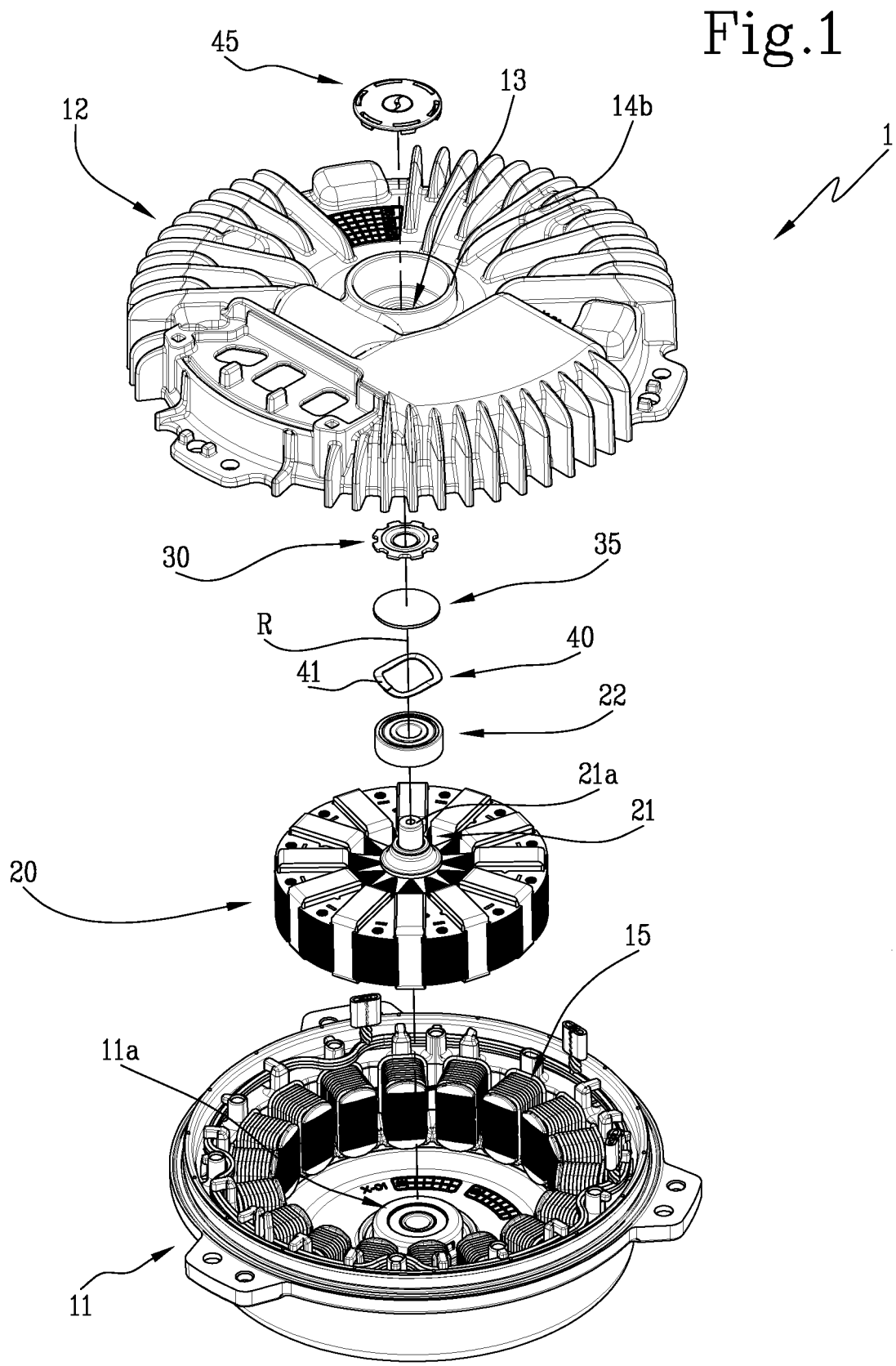
FIG. 1 shows a schematic perspective view, with some parts cut away for greater clarity, of an electric machine according to this disclosure.
Figure 2:
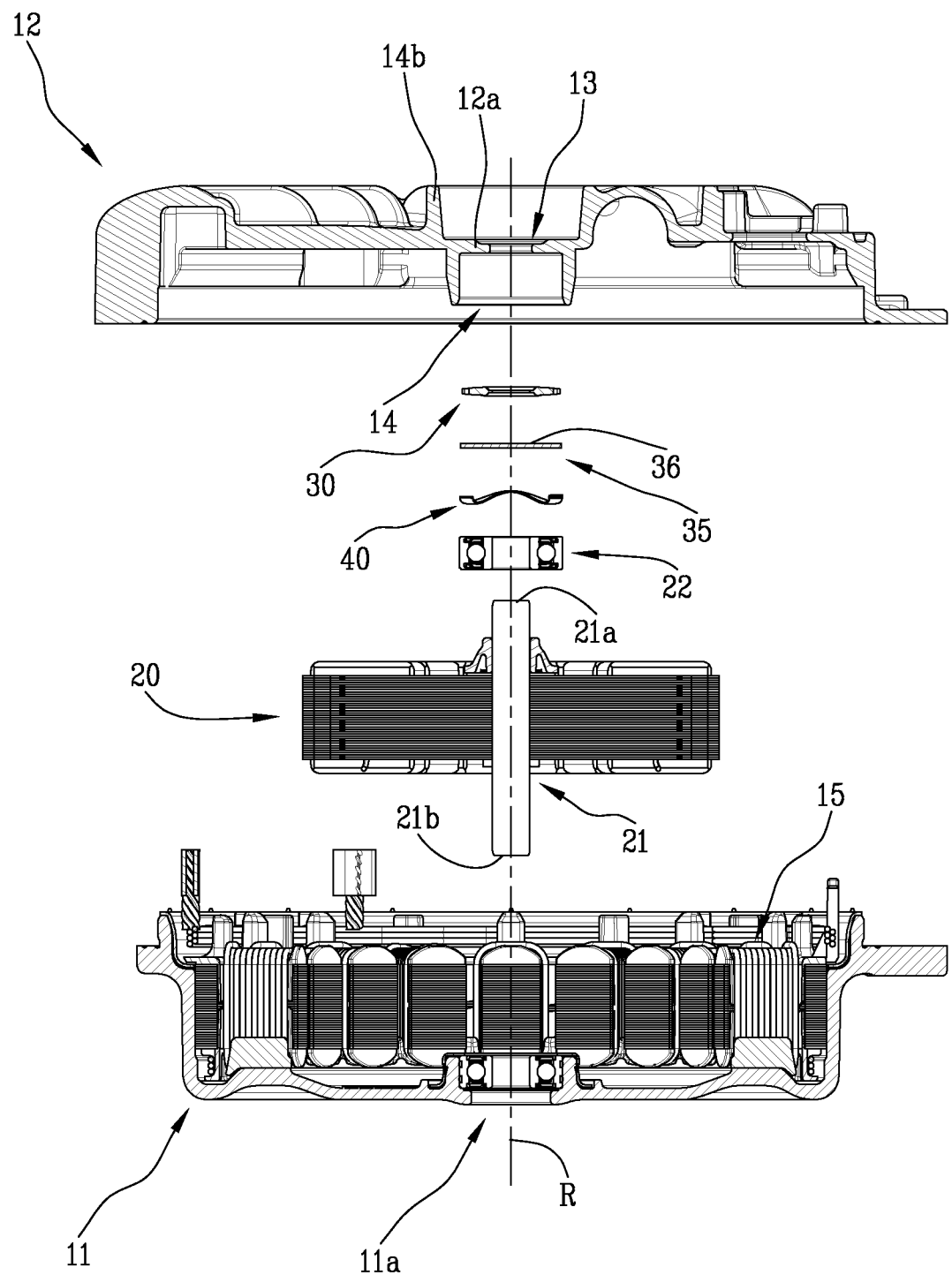
FIG. 2 shows an electric machine according to this disclosure in an exploded view partly in cross section.

With reference to the drawings, a rotary electric machine according to this disclosure is generically denoted by the numeral 1 and is hereinafter referred to simply as "electric machine 1".

The electric machine 1 is preferably a sealed electric machine and express reference is also made to machines of this kind without thereby losing in generality.

The electric machine 1 comprises an enclosure 10 which delimits an internal space "V".

In the preferred embodiment, the enclosure 10 comprises a casing 11 and a cap 12 which is fixed to the casing 11 in such a way as to seal the gap between them to define an internal space "V".

The internal space "V" houses a stator unit 15, fixed to the casing 11 and comprising a plurality of conductive windings.

The internal space "V" at least partly houses a rotor unit 20 which is magnetically associated with the stator unit 15 to define a brushless motor.

The electric machine 1 comprises an electronic module 16 connected to the stator unit 15 and configured to modulate an electric current in the windings of the stator unit 15 in such a way as to drive the rotor unit 20 in rotation.

The rotor unit 20 comprises a shaft 21 rotatable about a respective axis of rotation "R" and connected to the enclosure 10, specifically to the casing 11 and to the cap 12 by respective bearings.

The shaft 21 has a first end 21a, disposed inside the internal space "V", and a second end 21b, disposed outside the internal space "V" and configured to support a rotary element "O", preferably a fan, driven by the electric machine 1.

The casing 11 defines a hole 11a in which a portion of the shaft 21 between the first and the second end 21a and 21b is inserted.

The enclosure 10 is provided with an access hole 13 giving access to the internal space "V" and preferably defined in a wall 12a of the cap 12.

Preferably, the access hole 13 is coaxial with, and disposed opposite to, the hole 11a.

Preferably, the access hole 13 is coaxial with the shaft 21.

The first end 21a of the shaft 21 is disposed at a predetermined distance from the wall 12a, measured along the axis of rotation "R".

This distance is, for example, between 1 mm and 5 mm, preferably between 2.5 mm and 3.5 mm.

In the preferred embodiment, the enclosure 10 (specifically the cap 12) defines an internal housing 14 facing towards the internal space "V" at the access hole 13.

Preferably, the internal housing 14 is defined by a substantially annular protrusion extending around the axis of rotation "R", preferably facing towards the hole 11a.

Preferably, the electric machine 1 comprises a bearing 22 mounted to the shaft 21 at the first end 21a.

Preferably, the bearing 22 engages the internal housing 14 in such a way as to rotatably connect the first end 21a of the shaft 21 to the enclosure 10, specifically to the cap 12.

In the embodiment illustrated, the electric machine 1 comprises a further bearing, coaxial with the bearing 22 and disposed at the hole 11a to rotatably connect a central portion of the shaft 21 to the enclosure 10, specifically to the casing 11.

The hole 11a is preferably sealedly closed by the bearing in such a way as to isolate the enclosure 10 from external agents when the shaft 21 is rotating.

In the preferred embodiment, the bearing 22 is inserted snugly into the internal housing 14 and the internal housing 14 is at least partly shaped to match an outside surface of the bearing 22 to prevent vibration of the shaft 21.

In the embodiment illustrated, the enclosure 10, specifically the cap 12, is provided with an annular protrusion 14b extending around the access hole 13 in the direction opposite to the protrusion defining the internal housing 14.

The electric machine 1 comprises a gasket 30 disposed inside the internal space "V", specifically inside the internal housing 14, at a position adjacent to the wall 12a so as too encircle the access hole 13.

More specifically, the gasket 30 is disposed in abutment against the wall 12a so it is pressed against the wall 12a by a flat body pressed against the wall 12a from the inside out of the internal spacing "V".

Preferably, the gasket 30 has a substantially annular shape and a toothed outer profile.

The electric machine 1 comprises a closing element 35 disposed inside the internal space "V", specifically inside the internal housing 14, in such a way that the gasket 30 is interposed between it and the wall 12a.

Preferably, the closing element 35 has a flat disc-shaped body, preferably lying in a plane perpendicular to the axis of rotation "R".

Preferably, the closing element 35 is substantially shaped to match a cylindrical lateral surface of the internal housing 14 and is slidably inserted into the internal housing 14.

In the embodiment illustrated, the closing element 35 is disconnected from the gasket 30, whilst in alternative embodiments, the closing element 35 and the gasket 30 may be connected or made as one piece.

Figure 3:
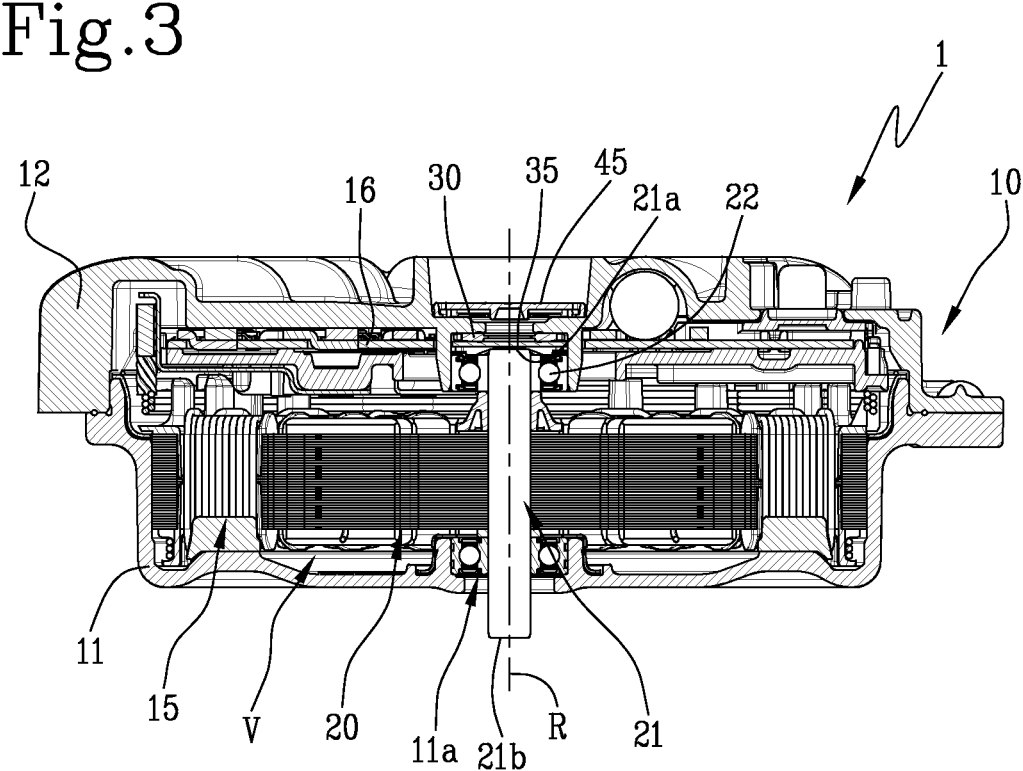
FIG. 3 shows a cross section of an electric machine made according to this disclosure.
Figure 3A:
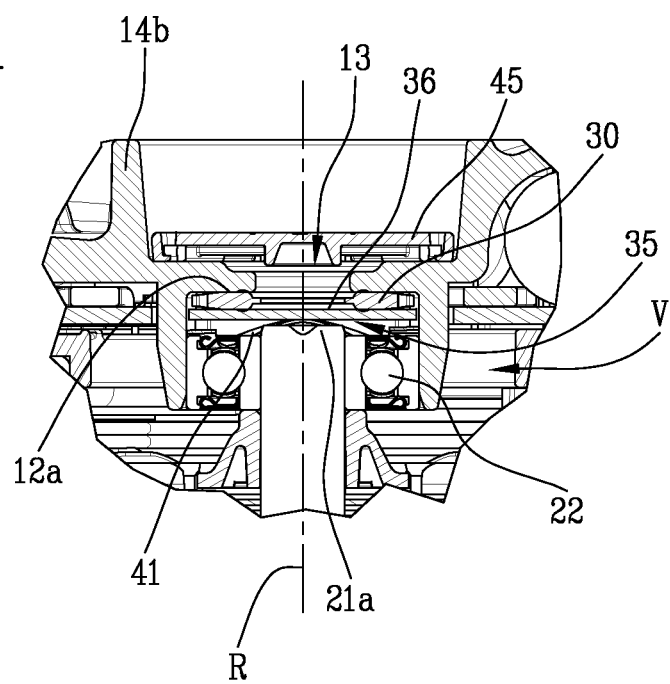
FIG. 3A shows a detail of an electric machine made according to this disclosure.
Figure 4:
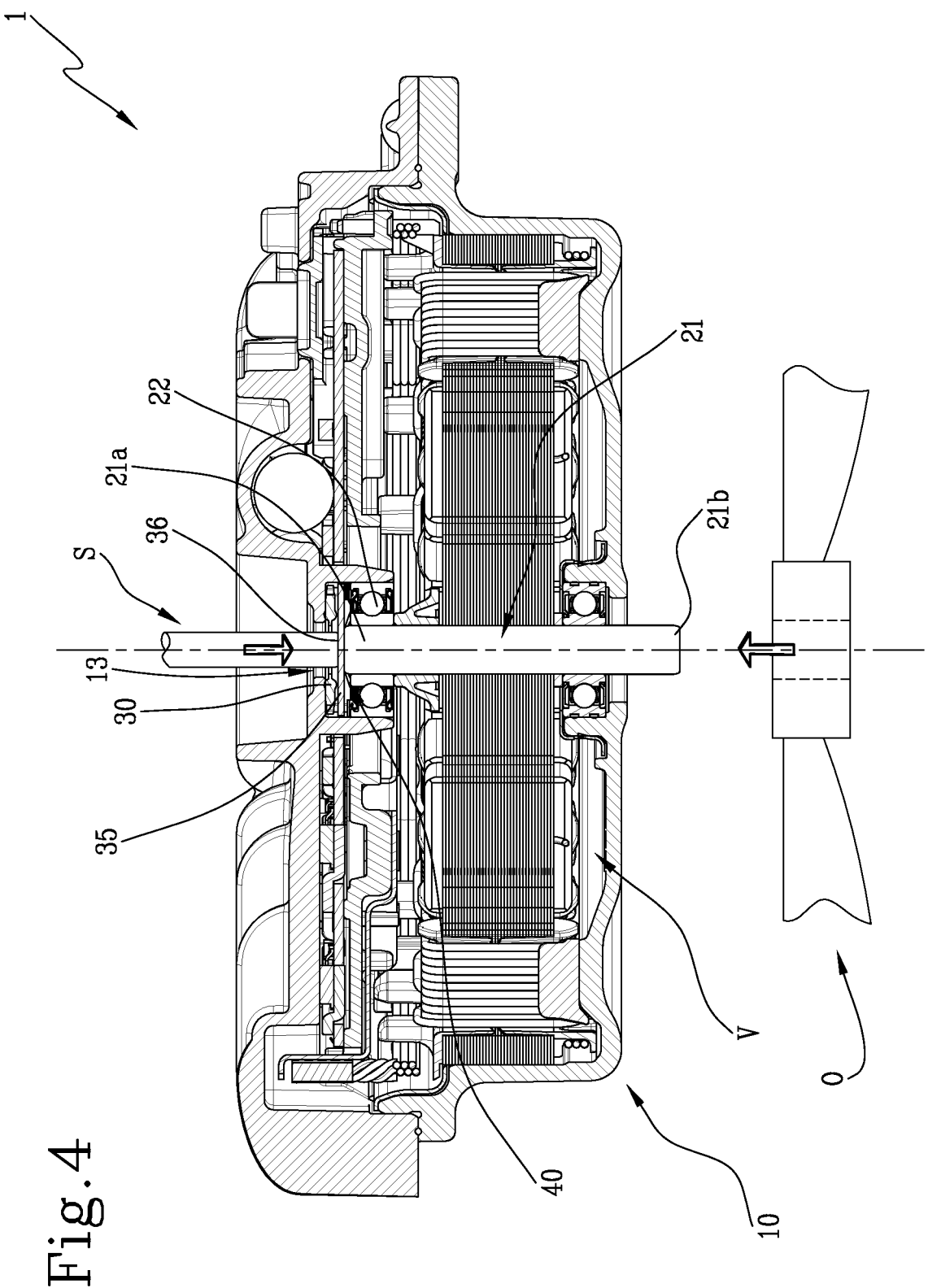
FIG. 4 shows a detail of an electric machine in an operating step of a method according to this disclosure.

The closing element 35 can be moved towards and away from the wall 12a (and the access hole 13) between a closed configuration, illustrated in FIGS. 3 and 3A, and an open configuration, illustrated in FIG. 4.

This movement is preferably parallel to the axis of rotation "R".

In the closed configuration, the closing element 35 compresses the gasket 30 against the wall 12a to seal the access hole 13.

In the open configuration, the closing element 35 is spaced from the wall 12a (and from the gasket 30).

The closing element 35 has a preferably flat pressure surface 36 facing the access hole 13 and accessible through the access hole, for example by inserting a pin "S", as shown in FIG. 4.

Preferably, the closing element 35 can be moved by pushing the pressure surface 36 along the axis of rotation "R" between the closed configuration and the open configuration.

In the open configuration, the closing element 35 is preferably disposed in abutment against the first end 21a of the shaft 21.

The electric machine 1 comprises elastic means 40 operating on the closing element 35 to move the closing element from the open configuration to the closed configuration.

The elastic means 40 are configured to compress the gasket 30 between the closing element 35 and the wall 12a to seal the access hole 13.

To move the closing element 35 from the closed position to the open position, it is necessary to apply a force on the pressure surface 36 to overcome the force applied by the elastic means 40.

The enclosure 10 is sealed in such a way that when the closing element 35 is in the open configuration, the access hole 13 is the only means of fluid communication between the internal space "V" and the surrounding atmosphere and, when it is in the closed configuration, the internal space "V" is completely isolated because the closing element 35 is pressed against the cap 12 by the elastic means 40.

Preferably, the elastic means 40 comprise an elastic element 41—for example, a spring or an elastomer—to move the closing element 35 from the open configuration to the closed configuration.

In a preferred embodiment illustrated by way of example, the elastic element 41 is interposed between the bearing 22 and the closing element 35 to apply a force which pushes the bearing 22 and the closing element 35 away from each other.

In other words, in the embodiment illustrated, the bearing 22 acts as an opposing element for the elastic element 41.

The elastic element 41 is interposed between the bearing 22 and the closing element 35 in a precompressed configuration so that the closing element 35 is pressed against the gasket 30 both in the open configuration and in the closed configuration.

Preferably, the elastic element 41 comprises (or is itself constituted by) a substantially annular wave spring centred on the axis of rotation "R".

In the embodiment illustrated by way of example, the elastic spring has exactly three waves.

The wave spring is housed inside the internal housing 14 and has an outer profile which is substantially shaped to match a cylindrical surface of the internal housing 14 in such a way that there is no radial play.

The wave spring has first abutment portions, specifically coinciding with respective "depressions" in the wave profile of the wave spring, disposed in abutment against an outer thrust ring of the bearing 22, that is, against the thrust ring of the bearing 22 which is mounted to the internal housing 14.

The wave spring has second abutment portions, opposite to the first abutment portions in the direction of the axis of rotation "R" and coinciding with respective "crests" in the wave profile of the wave spring, disposed in abutment against the closing element 35.

Preferably, the wave spring is substantially equal in diameter to the outer thrust ring of the bearing 22.

Preferably, the electric machine 1 comprises a plug 45 reversibly connectable to the outside of the enclosure 10 to prevent access to the access hole 13 so that the access hole cannot be accidentally opened.

Preferably, the annular protrusion 14b defines a housing to receive the plug 45 and a shoulder protecting the plug.

The plug 45 may be permanently fixed in place by a resin or other kind of gluing substance to prevent tampering with the motor through the access hole 13.

The resin may be provided, for example, inside the annular protrusion 14b to completely seal the hole 13 together with the plug 45, as explained in more detail below.

This invention also has for an object a method for making or assembling a rotary electric machine, specifically a method for mounting a rotary element "O" to the shaft 21.

The method comprises a first step of preparing an electric machine 1 like the one described above, with or without the plug 45.

Next, the method comprises a step of inserting a pin "S" into the access hole 13 and pressing the pin "S" against the pressure surface 36 of the closing element 35 in such a way as to move the closing element 35 from the closed configuration to the open configuration.

The pressure must be sufficient to overcome the resistance of the elastic means 40.

Preferably, the method comprises a step of mounting a rotary element "O", preferably a fan, to the second end 21b of the shaft 21, illustrated in FIG. 4.

The step of mounting comprises a step of pressing the rotary element "O" against the second end 21b in a direction parallel to the axis of rotation "R".

The step of mounting comprises a simultaneous step of pressing the closing element 35 against the first end 21a of the shaft 21 in a direction parallel to the axis of rotation "R" in such a way as to keep the closing element 35 against the first end 21a and to push it against the shaft 21 with a force substantially equal to (or to much the same extent as) the pushing force applied on the second end 21b.

Advantageously, the pushing force on the first end 21a absorbs the stress applied to the shaft 21 resulting from the step of mounting the rotary element "O" and prevents this stress from being discharged onto the bearings that connect the shaft 21 to the enclosure 10.

Preferably, the step of pressing the closing element 35 comprises a step of inserting a pin "S" into the access hole 13.

Preferably, the method comprises a final step of applying a resin or other gluing substance in the access hole 13 and/or in front of it on an outside surface of the enclosure 10, followed by a step of applying the plug 45 on the resin or gluing substance in order to seal the access hole 13, preferably permanently and/or irreversibly.

In alternative embodiments, the step of applying the plug precedes the step of applying the resin or other gluing substance in the access hole 13.

In practice, the plug 45 is first placed in the access hole 13 and then the resin is applied.

The invention achieves the set aim by overcoming the disadvantages of the prior art.

Advantageously, the electric machine described herein is provided with a mechanism for reversibly sealing the enclosure.

The method described allows mounting a rotary element to the electric machine without creating shear stresses in the bearings and thus preventing damage to the bearings.

The invention claimed is:

1. A rotary electric machine, comprising:
    an enclosure delimiting an internal space for containing a stator unit and a rotor unit coupled to the stator unit, the enclosure including an access hole giving access to the internal space;
    a gasket disposed inside the internal space at a position adjacent to a wall of the enclosure in such a way as to encircle the access hole;
    a closing element disposed in the internal space, movable towards and away from the wall between a closed configuration in which the closing element compresses the gasket to seal the access hole and an open configuration in which the closing element places the internal space in fluid communication with a surrounding atmosphere through the access hole;
    an elastic device operating on the closing element to move the closing element from the open configuration to the closed configuration and to compress the gasket between the closing element and the wall to seal the access hole;
    the closing element having a pressure surface facing the access hole and accessible through the access hole, so that pressing the pressure surface causes the closing element to move from the closed configuration to the open configuration.

2. The electric machine according to claim 1, wherein the rotor unit comprises a shaft rotatable about a respective axis of rotation and having a first end, inside the enclosure, and a second end, outside the enclosure, the closing element being, in the open configuration, disposed in abutment against the first end of the shaft.

3. The electric machine according to claim 2, wherein the access hole is coaxial with the shaft and the closing element is movable by pushing the pressure surface along the axis of rotation to move the closing element between the closed configuration and the open configuration.

4. The electric machine according to claim 3, comprising a bearing mounted to the first end of the shaft and wherein the enclosure defines an internal housing which accommodates the closing element, the gasket and at least part of the bearing, the elastic device comprising an elastic element interposed between the bearing and the closing element to apply a force which pushes the bearing and the closing element away from each other.

5. The electric machine according to claim 4, wherein the elastic element comprises a substantially annular wave spring having first abutment portions, disposed in abutment against an outer thrust ring of the bearing, and opposite second abutment portions, disposed in abutment against the closing element.

6. The electric machine according to claim 4, wherein the closing element comprises a disc-shaped body which is substantially shaped to match the internal housing and which is slidably inserted inside the internal housing.

7. The electric machine according to claim 1, wherein the gasket has a substantially annular shape and a toothed outer profile.

8. The electric machine according to claim 1, and further comprising a plug positioned at an exterior of the access hole.

9. The electric machine according to claim 1, wherein the elastic device comprises a substantially annular wave spring.

10. The electric machine according to claim 9, wherein the closing element comprises a disc-shaped body.

11. The electric machine according to claim 1, wherein the closing element comprises a disc-shaped body.

12. A method for making a rotary electric machine comprising the steps of:
    providing an electric machine comprising:

an enclosure delimiting an internal space for containing a stator unit and a rotor unit coupled to the stator unit, the enclosure including an access hole giving access to the internal space;

a gasket disposed inside the internal space at a position adjacent to a wall of the enclosure in such a way as to encircle the access hole;

a closing element disposed in the internal space, movable towards and away from the wall between a closed configuration in which the closing element compresses the gasket to seal the access hole and an open configuration in which the closing element places the internal space in fluid communication with a surrounding atmosphere through the access hole;

an elastic device operating on the closing element to move the closing element from the open configuration to the closed configuration and to compress the gasket between the closing element and the wall to seal the access hole;

the closing element having a pressure surface facing the access hole and accessible through the access hole, so that pressing the pressure surface causes the closing element to move from the closed configuration to the open configuration;

inserting a pin into the access hole and pressing the pin against the pressure surface to move the closing element from the closed configuration to the open configuration;

removing the pin to allow closing the enclosure.

13. The method according to claim 12, and further comprising a step of mounting a rotary element, to the second end of the shaft, the step of mounting the rotary element comprising a step of pressing the rotary element against the second end of the shaft and a simultaneous step of pressing the closing element against the first end of the shaft.

14. The method according to claim 13, wherein the step of pressing the closing element against the first end of the shaft comprises the step of inserting the pin into the access hole.

15. The method according to claim 13, wherein the rotary unit is a fan.

16. The method according to claim 12, and further comprising a final step of applying a resin or other gluing substance on the access hole and applying a plug on the resin or other gluing substance to seal the access hole.

* * * * *